United States Patent [19]
Lee

[11] Patent Number: 5,771,081
[45] Date of Patent: Jun. 23, 1998

[54] BIT SYSTEM FOR TRANSMITTING DIGITAL VIDEO DATA

[75] Inventor: Sang Hoon Lee, Seoul, Rep. of Korea

[73] Assignee: Korea Telecommunication Authority, Seoul, Rep. of Korea

[21] Appl. No.: 595,178

[22] Filed: Feb. 1, 1996

Related U.S. Application Data

[63] Continuation-in-part of Ser. No. 307,234, Sep. 16, 1994, abandoned.

[30] Foreign Application Priority Data

Feb. 28, 1994 [KR] Rep. of Korea ................... 1994-3768

[51] Int. Cl.⁶ .................................................. H04N 7/64
[52] U.S. Cl. ..................... 348/845.1; 348/466; 348/390
[58] Field of Search .............................. 348/845.1, 461, 348/466, 390, 403, 410, 416, 400, 415; 370/54.1, 392; 375/2.2

[56] References Cited

U.S. PATENT DOCUMENTS

| | | | |
|---|---|---|---|
| 5,455,629 | 10/1995 | Sun et al. | 348/466 |
| 5,493,334 | 2/1996 | Birch et al. | 348/461 |
| 5,563,887 | 10/1996 | Harasaki | 330/94.1 |
| 5,572,532 | 11/1996 | Fimoff et al. | 377/2.2 |
| 5,614,507 | 3/1997 | Tamer et al. | 370/392 |

*Primary Examiner*—Victor R. Kostak

[57] ABSTRACT

A digital video data transmitting apparatus capable of making a bit stream of video coding due to MPEG-coding having a plurality of picture groups, each having at least one intra picture and a plurality of predictive pictures, and each of the pictures consisting of a least one slice. The apparatus generates a first slice of the I-picture, and a second slice of the P-picture, and then selects the DC coefficient and motion vector from the first and second slices. The selected information is stored in an RS-encoding buffer. One of the generated slices included in the picture is then transmitted into a user data section of the encoded buffer to conform with the MPEG-standard bit stream. Parity data is assigned to the encoded macro block of corresponding slices so that the parity data is transmitted. In accordance with the apparatus, the amount of added information resulting from the error correction codes is greatly reduced by 50% or greater, as compared to conventional methods. Since the amount of saved information can be used again in the process of picture coding, the quality of recovered pictures is improved. Therefore it is also possible to slowly decrease PSNR of recovered pictures despite an increase in CLR and obtain a good picture quality without the presence of B-picture.

3 Claims, 6 Drawing Sheets

BIT SYSTEM FOR TRANSMITTING DIGITAL VIDEO DATA

This application is a continuation-in-part application of U.S. Ser. No. 08/307,234 filed on Sep. 16, 1994 entitled "METHOD FOR SELECTIVELY CORRECTING ERRORS GENERATED UPON TRANSMITTING DIGITAL VIDEO DATA" which has now been abandoned.

BACKGROUND OF THE INVENTION

1. Field of the Invention

The present invention relates to a bit stream coding using an error data generated in transmitting digital video data. More particularly, the present invention relates to a bit stream for transmitting digital video data by processing the video data selected from the transmission errors which are included in the bit stream.

2. Background of the Invention

Recently, a method for selectively correcting errors as a video data coding has been proposed in a coding for transmitting the compressed video data using the Differential Pulse Coded Modulation/Discrete cosine Transformation via B-ISDN in asychronous transfer mode (ATM). Although compression of video signals and transmission of the compressed video signals have not been standardized yet, various methods therefor are being researched by virtue of high usefulness of a certain format in order to achieve transmission of a very large amount of data, in particular, HDTV. Standardization for the data compression and transmission is also being steadily advanced.

A data transmission in an ATM is the method for transmitting video signals via a B-ISDN. This data transmission method is being standardized by the International Telecommunication Union (ITU) Telecommunication Standardization (TS). In accordance with this method, video signals are transmitted by the cell which is a packet having a uniform length. As far as data compression methods used for video communication via the ATM transmission network are concerned, there are a variable bit rate (VBR) coding method and a constant bit rate (CBR) coding method. Due to characteristics of the ATM transmission network, research has been directed mainly at the VBR coding method. For the CBR coding method, research is being made only by the experts group under the influence of SG15 of the ITU-TS.

The standardization for the picture compression is also being made by experts groups under the influence of SG15 of the ITU-TS organized for the standardization of picture compression used in the ATM video communication, together with another experts group, namely, the Moving Picture Experts Group (MPEG). In the digital HDTV system proposed by the Federal Communication Commission (FCC) of the United States, a picture compression technology similar to that proposed by the MPEG is used.

Consequently, the most representative method of moving picture compression methods proposed up to the present may be the MPEG picture compression method.

In the ATM, all transmission paths always involve noise which causes the generation of bit errors. Also, the ATM involves the damage of channels and the loss of cells caused by the confusion of the network. Such a loss of cells forces a decoder to lose the synchronism because the compressed video data are very sensitive the transmission error. Moreover, the recovered picture is greatly damaged.

Now, we will illustrate FIG. 5 disclosed in the encoder system, which is used for correcting the video error in a bit stream during the signal transmission.

FIG. 5 shows the encoder system according to the prior art having the error correction code used for picture quality degradation.

Source coding can be divided into intraframe and interframe coding. In intraframe mode, the DPCM is not operative. Every 8×8 block in a picture frame is transformed into DCT coefficients in a DCT transformer (10), linearly quantized by a quantizer (12), and then sent to a variable length coder (50). The same picture frame is also recovered through an inverse quantizer (14) and inverse DCT transformers (16) and stored in a picture frame memory (18) for interframe coding.

During the interframe coding mode, the DPCM is in operation. The prediction is based on motion estimation in the motion estimator (22) by comparing every Macro Block (luminance only) of the current frame with the Macro Blocks in the neighborhood of the corresponding Macro Block in the previous frame. If the difference between the current and the predicted Macro Blocks is less than a certain threshold, no data is transformed for that Macro Block. Otherwise, the difference is DCT transformed, linearly quantized, and then sent to the video VLC (50) together with the motion vector information of a motion compensator (20).

The step size of the quantizer (12) can be adjusted depending on the fullness of the transmission buffer of the VLC (50). When the transmission buffer is close to full, the step size will be increased so that less information needs to be coded. This, of course, will result in a degraded picture. On the other hand, the step size will be decreased to improve picture quality when the transmission buffer is not full. In other words, the effects contained with the video information depending on the step size may disappear partially or completely at a higher transmission error generation rate. Thus, it has the problem of resulting in a decrease in transmission rate and a decrease in processing rate both caused by an addition of data in the process of error correction coding.

Therefore, an objective of the invention is to provide a bit stream for transmitting video data minimizing an increase in the data amount caused by an addition of error correction codes.

Another objective of the invention is to provide a bit stream for transmitting video data avoiding a decrease in data transmission rate while improving picture quality of recovered pictures.

SUMMARY OF THE INVENTION

In accordance with the present invention, this objective can be accomplished by providing a method for correcting errors generated upon transmitting digital video signals under a condition that each of the digital video signals is separated into six hierarchical layers, comprising the steps of: encoding data of four layers in video signals of the six hierarchical layers with RS codes as error correction codes, the data of four layers including various header information, DC coefficients of blocks of I-picture, MVs of predictive mode MBs of P-picture and DC coefficients of I-mode MBs of P-picture; converting the error correction codes respectively into parity signals and adding the parity signals to the ends of corresponding slices so that the parity signals are transmitted together with the slices. Therefore, the necessary amount of information that must be added to the transmitted information can be greatly reduced resulting in efficient data transfer.

The present invention involves a digital video data transmitting apparatus which is able to make a bit stream of video coding due to MPEG-coding having a plurality of picture groups, each having at least one intra picture and a plurality of predictive pictures, and each of the pictues consisting of at least one slice, the apparatus comprising: means for generating a first slice of the I-picture comprising a slice start code, a parity code calculated using a DC coefficient, and at least one macro block each having a macro block address, a macro block type, a quantizing scale, a DC coefficient and an AC coefficient, a second slice of the P-picture comprising a slice start code, a parity code calculated using motion vectors, and at least one macro block each having a macro block address, a macro block type, a quantizing scale, a motion vector, an encoded block pattern, and an AC coefficient; means for selecting the DC coefficient and the motion vector from the first and second slices, and storing them in an RS-encoding buffer; means for transmitting one of the slices included in a picture into a user data section of an encoder buffer to conform with the MPEG-Standard bit stream; and means for assigning the parity data to the encoded macro block of corresponding slices so that the parity data are transmitted together with the slice in a user data of the encoder buffer.

The present invention also involves a digital video data transmitting method which is able to make a bit stream of video coding due to MPEG-coding having a plurality of picture groups, each having at least one intra picture and a plurality of predictive pictures, and each of the pictures consisting of at least one slice, the method comprising the steps of: generating a first slice of the I-picture comprising a slice start code, a parity code calculated using a DC coefficient, and at least one macro block each having a macro block address, a macro block type, a quantizing scale, a DC coefficient and an AC coefficient, a second slice of the P-picture comprising a slice start code, a parity code calculated using motion vectors, and at least one macro block each having a macro block address, a macro block type, a quantizing scale, a motion vector, an encoded block pattern, and an AC coefficient; selecting the DC coefficient and the motion vector from the first and second slices, and storing them in an RS-encoding buffer; transmitting one of the slices included in a picture into a user data section of an encoder buffer to conform with the MPEG-Standard bit stream; and assigning the parity data to the encoded macro block of corresponding slices so that the parity data are transmitted together with the slice in a user data of the encoder buffer.

The present invention still further involves an RS-encoding method of a bit stream comprising the steps of: coding a macro block through a variable length coding table; storing a DC coefficient and a motion vector data contained in an RS-encoding buffer from the variable length table; RS-encoding the DC coefficient and the motion vector if the number of the DC coefficients and the motion vectors contained in the RS-encoded macro block is equal to that contained in the macro block included in one slice; and assigning a parity data by inserting it in a user data section of the bit stream.

BRIEF DESCRIPTION OF THE DRAWINGS

Other objects and the aspects of the invention will become apparent from the following description of embodiments in connection with the accompanying drawings in which.

DETAILED DESCRIPTION OF THE PREFERRED EMBODIMENTS

In a method for selectively correcting errors generated upon transmitting digital video data, Reed-Solomon (RS) codes are used as error correction codes. The RS codes have the form of cyclic symbol error correction codes. Since RS codes enable errors to be corrected by the symbol, they are very useful for burst errors. This means that RS codes are the most efficient error correction codes usable in the ATM transmission system.

Where the RS codes are used as the error correction code, it is important to identify whether the data of the error correction codes are to be applied or not, in order to carry out the error correction coding for a selected part of compressed bit streams of ATM video signal. Due to the MPEG-2 picture compression method which is representative of DPCM/DCT composite coding, a bit stream obtained by compressing input block pictures and encoding moving pictures is structured to have six layers including motion vectors, DCT coefficients classified into DC coefficients each indicative of mean brightness and AC coefficients, data indicative of the start and end of each layer, and other parameters.

Figure 1:
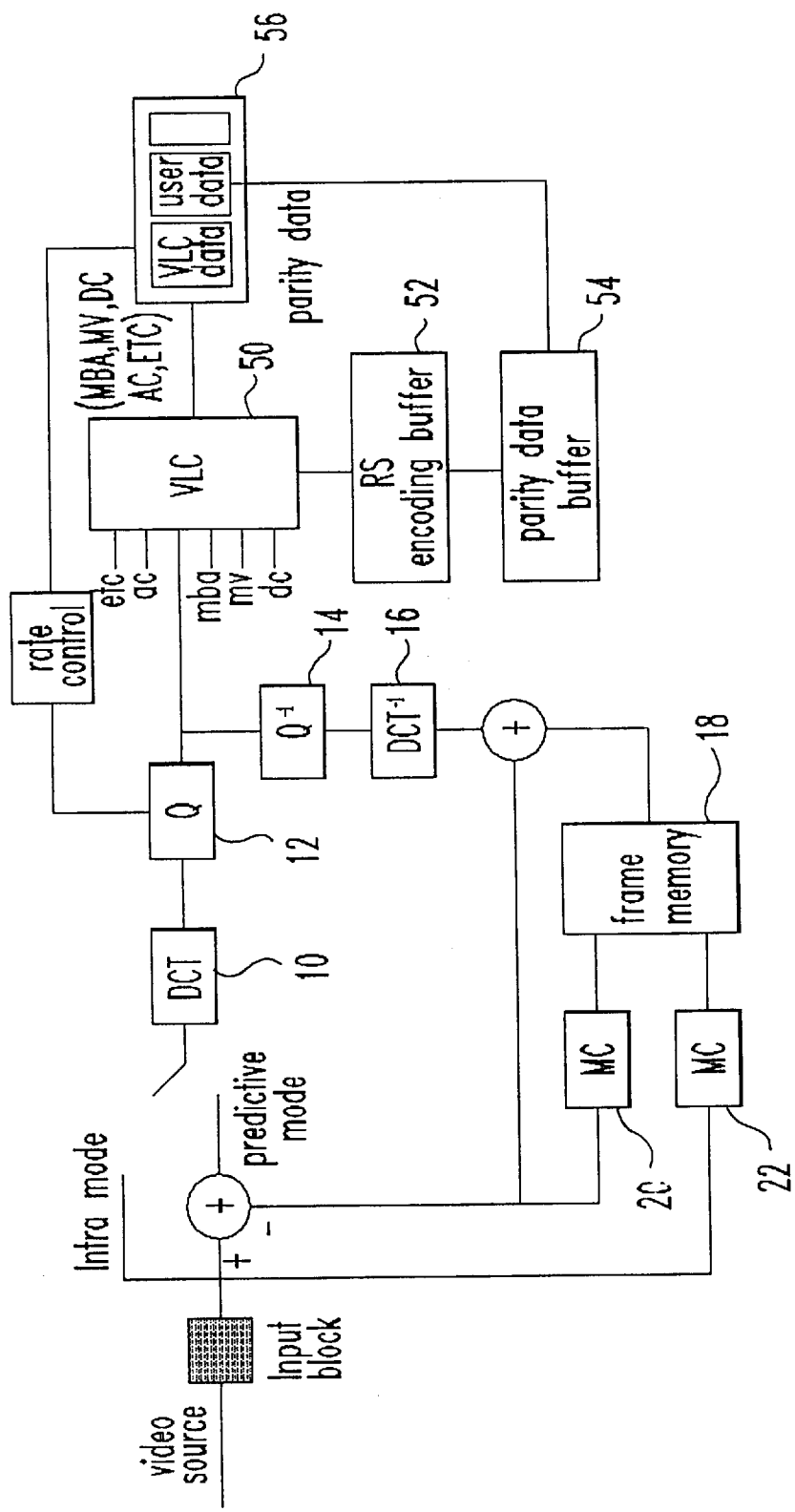
FIG. 1 shows a block diagram of the source encoder according to the present invention.
Figure 5:
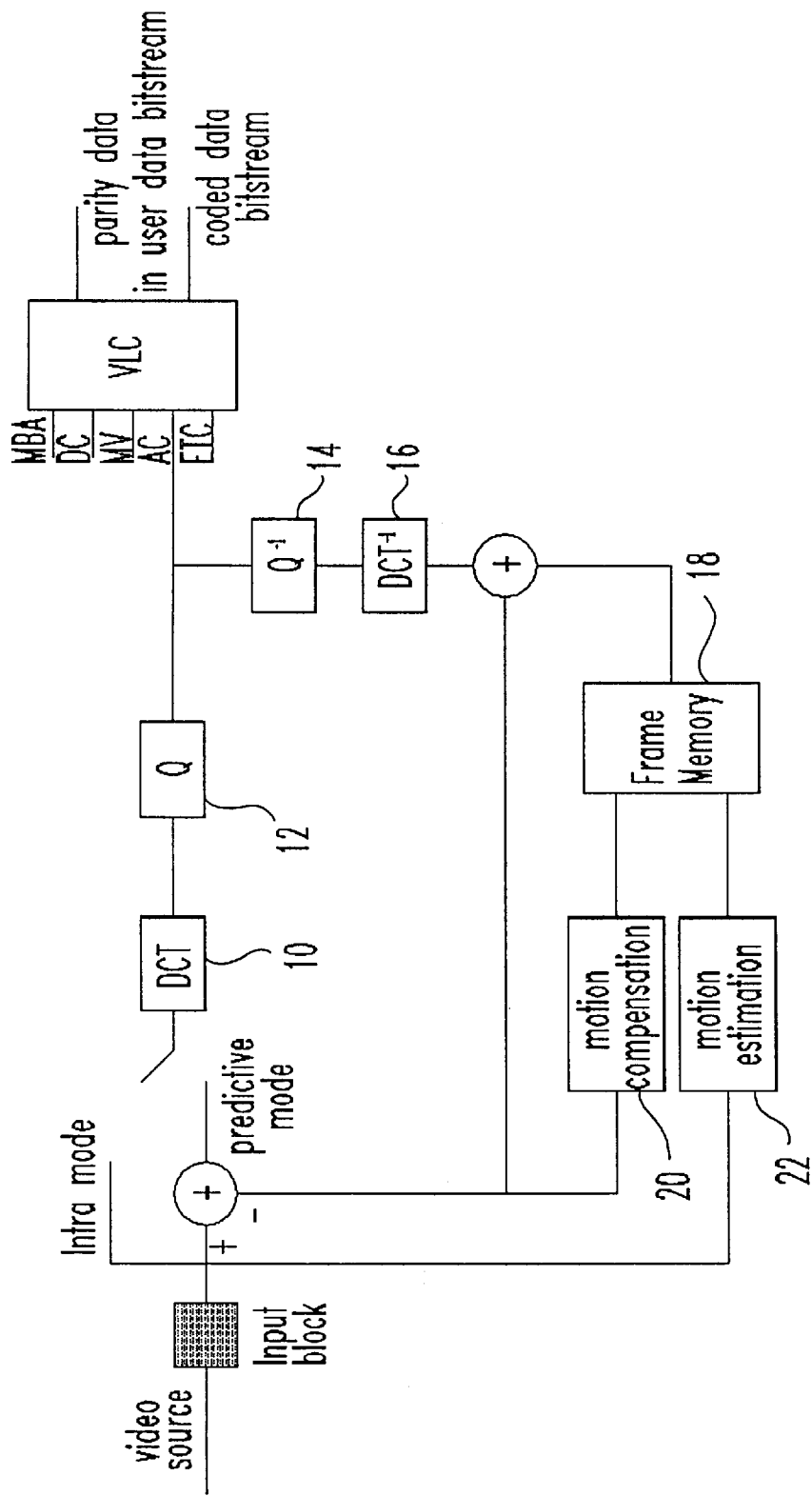
FIG. 5 shows the encoder architecture with selective error correcting code by means of the conventional encoder system.

A block diagram of the source encoder is shown in FIG. 1. The structure of the encoder having selective error correcting code proposed in MPEG coding is similar to that of FIG. 5. Therefore, we will omit a hybrid portion of DCT and DPCM (Differential Pulse Code Modulation) schemes with motion estimation. Nevertheless, in order to reduce the bit rate by removing redundant information, the RS-encoding buffer (52) according to the present invention is added between the VLC (50) and the parity buffer (56). Namely, to further increase coding efficiency, variable word-length coding is used in the RS-encoding buffer (52) linking VLC (50) which immediately follows the source coder. The operation used for selective error correcting mode will be described below.

Firstly, DC coefficient and motion vector (MV) are stored in the VLC (50). Secondly, the coding data is coded in the RS-encoding buffer (52). Every slice in one picture frame, i.e., the RS-code, DC and MV, are stored in a parity buffer (54). During one or more picture frame generations, the parity data (PD) from the buffer (54) proceeds to the encounter buffer (56).

Figure 2:
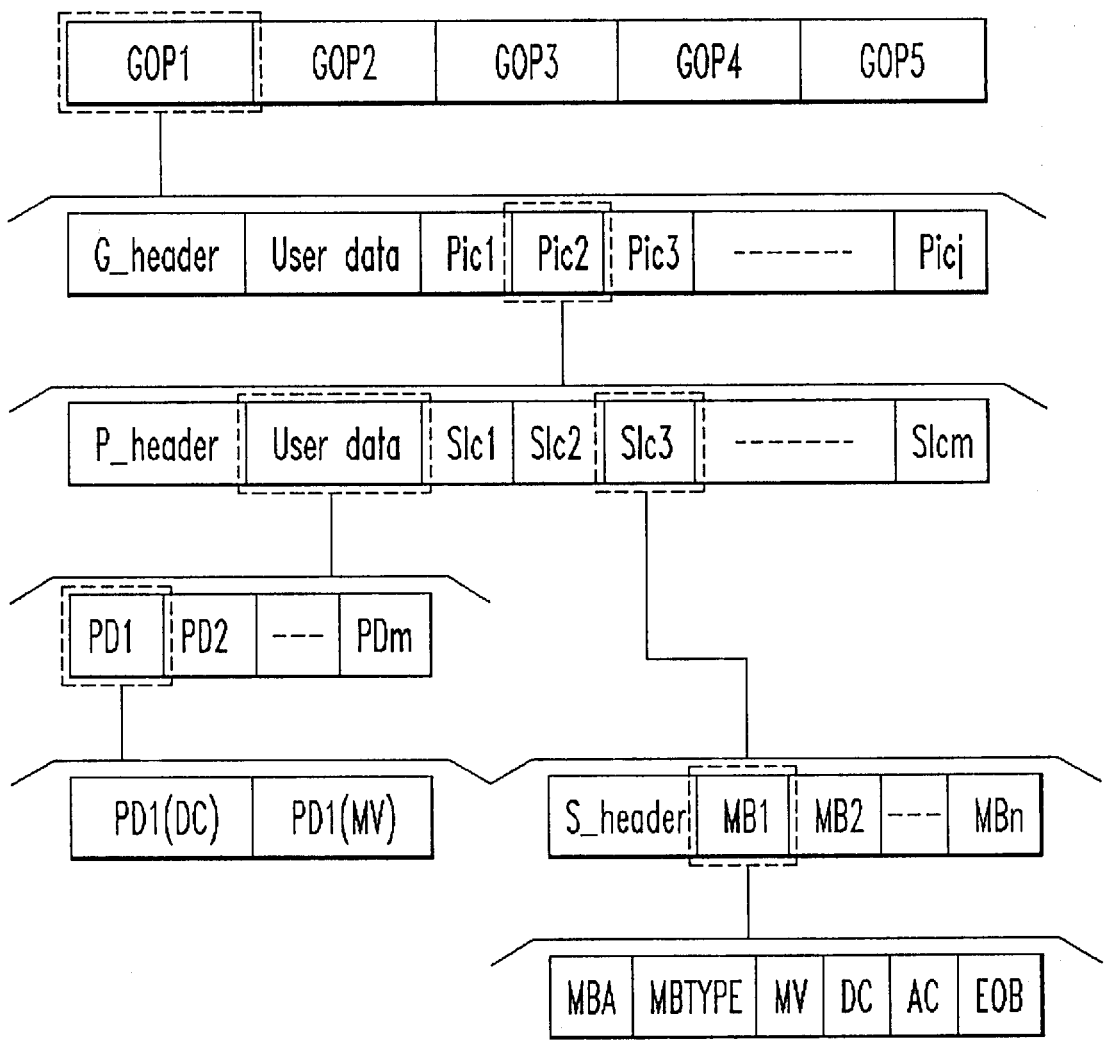
FIG. 2 shows a simplified hierarchical structure generated on the encoder of FIG. 1.

A simplified hierarchical structure with four layers of video data is shown in FIG. 2. The coding sequence of a data for each Group of Pictures (GOP) consists of a picture head (G-header) followed by data for Picj, e.g. Pic2, in the figures. The picture header (P-header) includes a bit start code and other information such as video format, temporal reference (frame number), etc.

The Pic2 layer consists of a P-header followed by a user data which includes, for example, the coded data for parity data (PD). The parity data depends on the DC coefficient and the motion vector (MV). The slices (Slcm) are segmented into macro blocks (MBn). Each macro block is comprised of MBA, MBTYPE, MV, DC, AC, and EOB. The MB layer consists of an S-header followed by data for blocks. The S-header includes a variable length code (VLC) for the MB address. It is followed by a VLC for MB type indicating whether it is intraframe or interframe, with or without motion estimation.

Figure 3A:
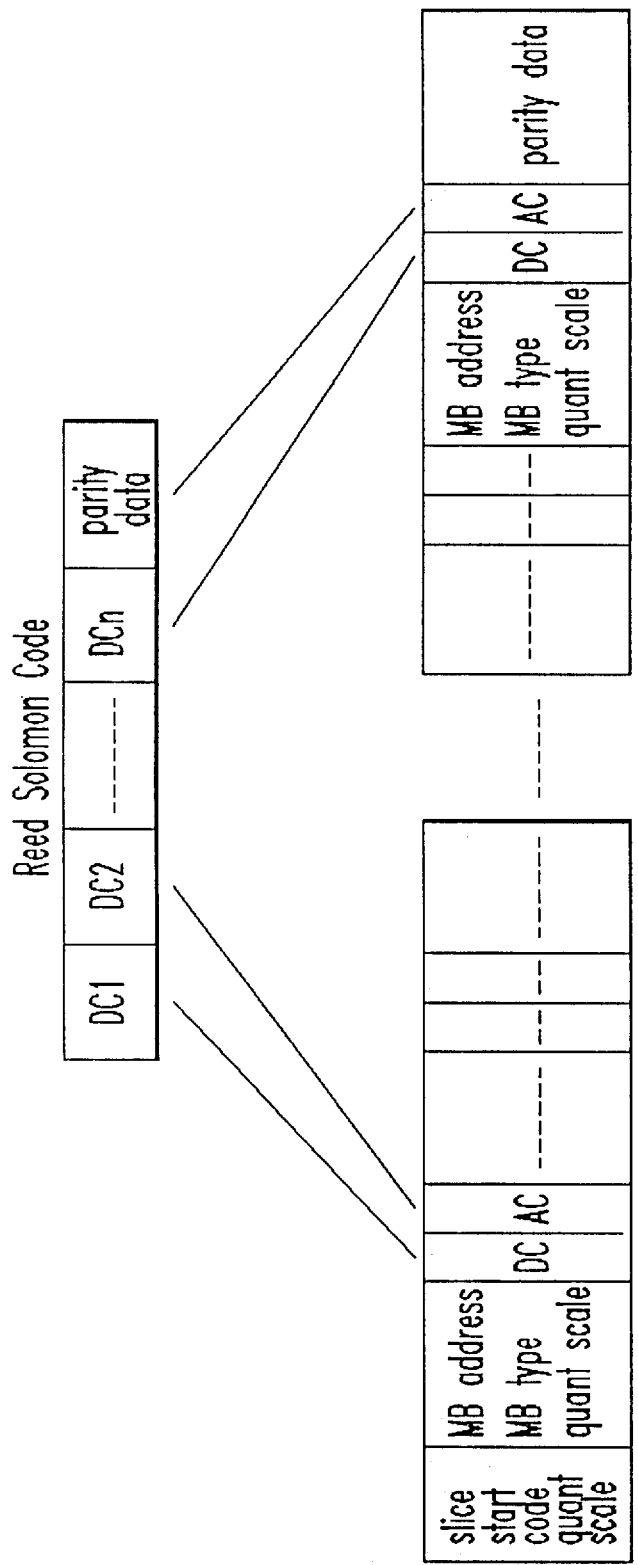
FIG. 3A shows a diagram of a bit stream illustrating the process of RS-coding for I-picture of FIG. 2.

FIG. 3A is a diagram of a bit string explaining the process of RS coding for I-picture. For I-picture, the RS coding is carried out by the slice that is the basic unit, so that the DC coefficient of each block is encoded with the RS code.

In other words, only the DPCM predictive errors of DC coefficients in all MBS included in each slice are collected and then encoded with RS codes. Where systematic codes are used in this case, only the parity code is added without any change of original information. The parity code is suffixed to the end of each slice.

Figure 3B:
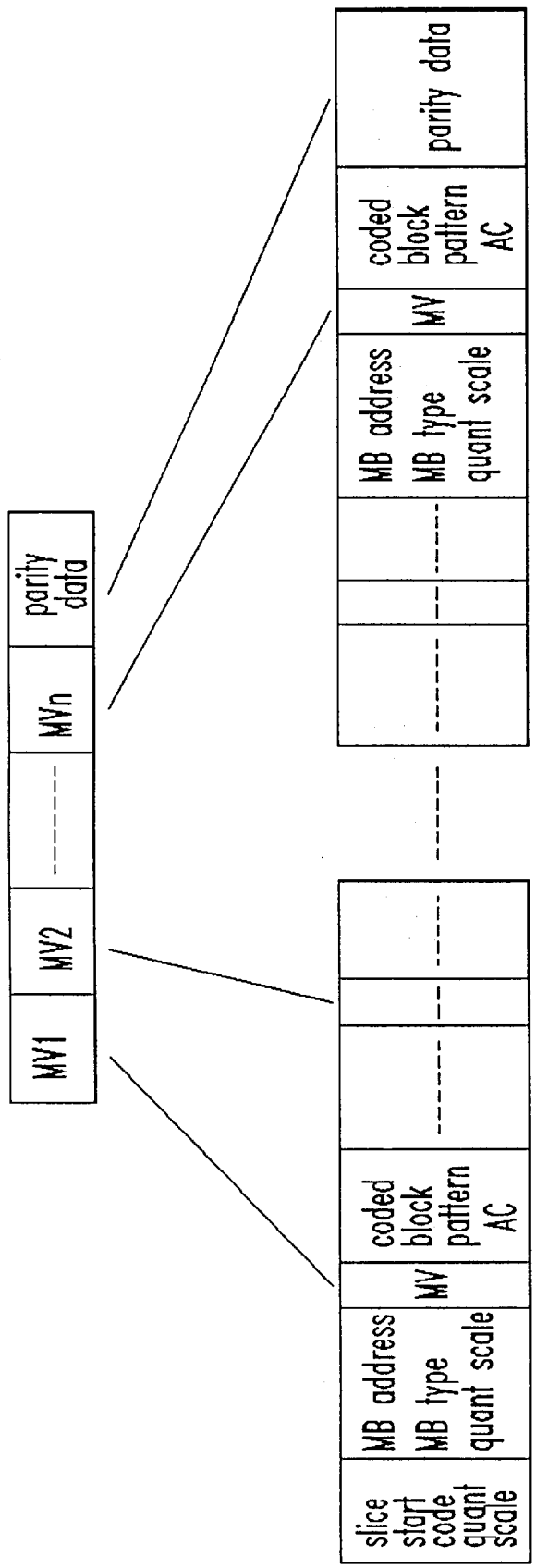
FIG. 3B shows a diagram of a bit stream illustrating the process of RS-coding for P-picture of FIG. 2.

FIG. 3B is a diagram of a bit string explaining the process of RS coding for P-picture. The principle of encoding MVs of P-picture with RS codes is the same as the principle of encoding DC coefficients of I-picture with RS codes.

Where I-mode MBs are generated in P-picture, DC coefficients of the I-mode MBS are encoded, together with MVs of predictive mode MBs. In accordance with this method, it is possible to efficiently perform the error correction coding because the amount of data added per unit cell in the process of RS coding is very small.

Figure 4:
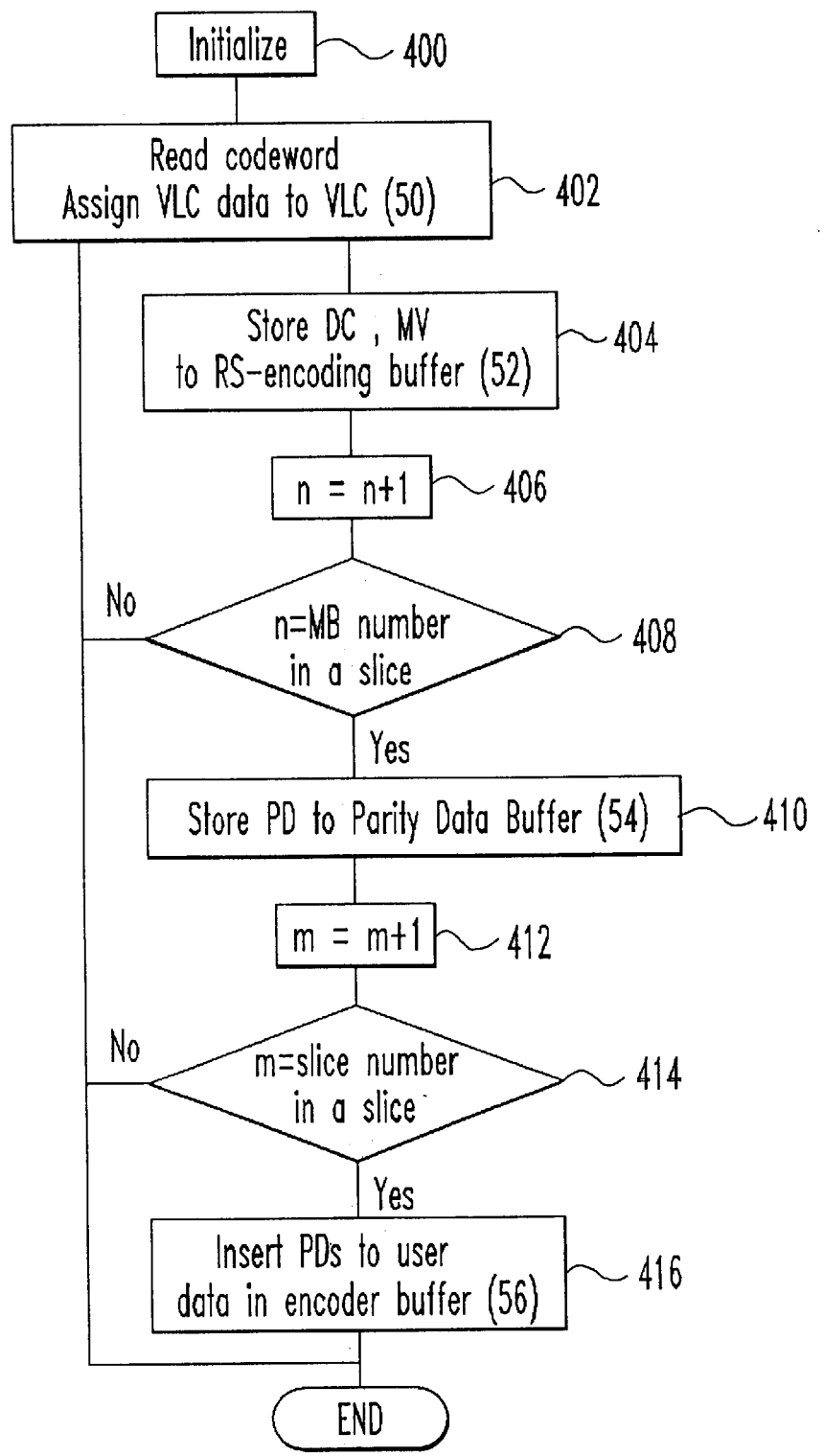
FIG. 4 shows a flowchart based on the bit stream for transmitting video data of FIG. 1.

FIG. 4 shows the flowchart of the bit stream for transmitting video data of the present invention. The RS-encoding mode initializes the encoder system by resetting the codeword data (mba, dc, mv, dc, etc.) to process the parity data generated for one slice (step 400). Once the codeword data is initialized, the RS-code reads out the codeword and then assigns VLC data from the VLC table into VLC (50) in step 402. Next, the codeword of the sequence stores DC, MV selected from MBS, DC, MV, AC, etc. into the RS-encoding buffer (52) of the step 404. Step 404 proceeds over step 406 to macro block in a slice of step 408. In step 408, if the MB number in a slice is equal to n number, the decision of step 408 proceeds to step 480. In this case, the parity data buffer (54) stores the parity data (PPi). If the decision of step 408 is no, the sequence returns to step 402. Next, the sum of the slice numbers corresponding to the next slice in a picture is added to the previous partial sum (step 412). Each time a partial sum is produced, a decision is made between the current slice numbers (step 414). If the comparison for n is equal to a slice in a picture, the parity data is inserted into the user data of the encoder buffer (56) (step 416).

As apparent from the above description, the present invention provides a method for selectively correcting errors generated upon transmitting digital video data by encoding data of four layers in video signals of six hierarchical layers with RS codes as error correction codes, the data of four layers including various header information, DC coefficients of blocks of I-picture, MVs of predictive mode MBs of P-picture and DC coefficients of I-mode MBs of P-picture, converting the error correction codes respectively into parity signals, and adding the parity signals to the ends of corresponding slices so that the parity signals are transmitted together with the slices. In accordance with the method of the present invention, the amount of added information resulting from the error correction codes is substantially reduced by 90% or greater, as compared to the conventional method. Since the amount of saved information can be used again in the process of picture coding, the quality of recovered pictures is improved. In accordance with the method of the present invention, it is possible to slowly decrease PSNR of recovered pictures despite an increase in CLR and obtain a good picture quality without the presence of B-picture.

Accordingly, the present invention is useful in a system such as HDTV which requires a low delay coding mode.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A digital video data transmitting apparatus which is able to make a bit stream of video coding due to MPEG-coding having a plurality of picture groups, each having at least one intra picture and a plurality of predictive pictures, and each of the pictures consisting of at least one slice, the apparatus comprising:

means for generating a first slice of the I-picture comprising a slice start code, a parity code calculated using a DC coefficient, and at least one macro block each having a macro block address, a macro block type, a quantizing scale, a DC coefficient and an AC coefficient, a second slice of the P-picture comprising a slice start code, a parity code calculated using motion vectors, and at least one macro block each having a macro block address, a macro block type, a quantizing scale, a motion vector, an encoded block pattern, and an AC coefficient;

means for selecting the DC coefficient and the motion vector from the first and second slices, and storing them in an RS-encoding buffer;

means for transmitting one of the slices included in a picture into a user data section of an encoder buffer to conform with the MPEG-Standard bit stream; and means for assigning the parity data to the encoded macro block of corresponding slices so that the parity data are transmitted together with the slice in a user data of the encoder buffer.

2. A digital video data transmitting method which is able to make a bit stream of video coding due to MPEG-coding having a plurality of picture groups, each having at least one intra picture and a plurality of predictive pictures, and each of the pictures consisting of at least one slice, the method comprising the steps of:

generating a first slice of the I-picture comprising a slice start code, a parity code calculated using a DC coefficient, and at least one macro block each having a macro block address, a macro block type, a quantizing scale, a DC coefficient and an AC coefficient, a second slice of the P-picture comprising a slice start code, a parity code calculated using motion vectors, and at least one macro block each having a macro block address, a macro block type, a quantizing scale, a motion vector, an encoded block pattern, and an AC coefficient;

selecting the DC coefficient and the motion vector from the first and second slices, and storing them in an RS-encoding buffer;

transmitting one of the slices included in a picture into a user data section of an encoder buffer to conform with the MPEG-Standard bit stream; and assigning the parity data to the encoded macro block of corresponding slices so that the parity data are transmitted together with the slice in a user data of the encoder buffer.

3. An RS-encoding method of a bit stream comprising the steps of;

coding a macro block through a variable length coding table;

storing a DC coefficient and a motion vector data contained in an RS-encoding buffer from the variable length table;

RS-encoding the DC coefficient and the motion vector if the number of the DC coefficients and the motion vectors contained in the RS-encoded macro block is equal to that contained in the macro block included in one slice; and assigning a parity data by inserting it in a user data section of the bit stream.

* * * * *